United States Patent
Rankin

(10) Patent No.: US 11,861,025 B1
(45) Date of Patent: Jan. 2, 2024

(54) SYSTEM AND METHOD FOR RECEIVING AND PROCESSING A SIGNAL WITHIN A TCP/IP PROTOCOL STACK

(71) Applicant: John Rankin, Morgantown, WV (US)

(72) Inventor: John Rankin, Morgantown, WV (US)

(73) Assignee: Rankin Labs, LLC, Williamsport, OH (US)

( * ) Notice: Subject to any disclaimer, the term of this patent is extended or adjusted under 35 U.S.C. 154(b) by 1238 days.

(21) Appl. No.: 16/242,874

(22) Filed: Jan. 8, 2019

Related U.S. Application Data

(60) Provisional application No. 62/614,549, filed on Jan. 8, 2018.

(51) Int. Cl.
   *G06F 21/60* (2013.01)
   *H04L 69/325* (2022.01)
   *H04L 69/16* (2022.01)

(52) U.S. Cl.
   CPC ............ *G06F 21/606* (2013.01); *H04L 69/16* (2013.01); *H04L 69/325* (2013.01)

(58) Field of Classification Search
   CPC ...... G06F 21/606; H04L 69/16; H04L 69/325
   See application file for complete search history.

(56) References Cited

U.S. PATENT DOCUMENTS

| | | | |
|---|---|---|---|
| 3,688,090 A | 8/1972 | Rankin | |
| 6,023,724 A | 2/2000 | Bhatia et al. | |
| 6,567,416 B1 | 5/2003 | Chuah | |
| 6,714,985 B1 | 3/2004 | Malagrino et al. | |
| 6,757,248 B1 | 6/2004 | Li et al. | |
| 7,103,025 B1 | 9/2006 | Choksi | |
| 7,215,684 B1 | 5/2007 | Rosen et al. | |
| 8,090,866 B1 | 1/2012 | Bashyam et al. | |
| 8,131,281 B1 | 3/2012 | Hildner et al. | |
| 8,374,091 B2 * | 2/2013 | Chiang | H04W 8/04 370/252 |
| 8,397,151 B2 | 3/2013 | Salgado et al. | |
| 8,730,966 B2 | 5/2014 | Awano | |
| 9,203,755 B1 | 12/2015 | Wong et al. | |
| 9,350,663 B2 | 5/2016 | Rankin | |
| 9,386,028 B2 | 7/2016 | Altman | |
| 9,626,522 B1 | 4/2017 | Flowers, Jr. | |
| 11,032,257 B1 | 6/2021 | Rankin | |

(Continued)

FOREIGN PATENT DOCUMENTS

CN   103841118 A   6/2014

OTHER PUBLICATIONS

Thyer, J., Covert Data Storae Channel Using IP Packet Headers, SANS Institute, Information Security Reading Room, Jan. 30, 2008.

(Continued)

*Primary Examiner* — Hitesh Patel
*Assistant Examiner* — Sujana Khakural
(74) *Attorney, Agent, or Firm* — Standley Law Group LLP; Jeffrey S. Standley; Adam J. Smith

(57) ABSTRACT

A method for receiving and processing a covert transmission within a TCP/IP protocol stack is described. An IP protocol layer receives a datagram comprising covert data. The datagram is adapted to appear as an error at a TCP layer. The datagram is intercepted at an IP layer routine below the TCP layer. The intercepted datagram is processed by an extension of an IP layer routine.

14 Claims, 3 Drawing Sheets

(56) References Cited

U.S. PATENT DOCUMENTS

| | | | |
|---|---|---|---|
| 2001/0017844 A1 | 8/2001 | Mangin | |
| 2001/0019614 A1 | 9/2001 | Madoukh | |
| 2002/0041592 A1 | 4/2002 | Van Der Zee et al. | |
| 2002/0054570 A1 | 5/2002 | Takeda | |
| 2002/0071436 A1 | 6/2002 | Border et al. | |
| 2002/0114341 A1 | 8/2002 | Sutherland et al. | |
| 2002/0164024 A1 | 11/2002 | Arakawa et al. | |
| 2003/0031198 A1 | 2/2003 | Currivan et al. | |
| 2003/0048793 A1* | 3/2003 | Pochon | H04L 43/00 370/389 |
| 2003/0056009 A1 | 3/2003 | Mizrachi et al. | |
| 2003/0108063 A1* | 6/2003 | Joseph | H04L 12/6418 370/465 |
| 2003/0115364 A1 | 6/2003 | Shu et al. | |
| 2004/0210763 A1 | 10/2004 | Jonas | |
| 2005/0058129 A1 | 3/2005 | Jones et al. | |
| 2005/0060538 A1 | 3/2005 | Beverly | |
| 2005/0105506 A1 | 5/2005 | Birdwell et al. | |
| 2005/0286517 A1 | 12/2005 | Babbar et al. | |
| 2006/0002681 A1 | 1/2006 | Spilo et al. | |
| 2006/0034317 A1 | 2/2006 | Hong et al. | |
| 2006/0133364 A1 | 6/2006 | Venkatsubra | |
| 2006/0259587 A1 | 11/2006 | Ackerman et al. | |
| 2007/0025388 A1 | 2/2007 | Abhishek et al. | |
| 2007/0028121 A1 | 2/2007 | Hsieh | |
| 2007/0223395 A1 | 9/2007 | Lee et al. | |
| 2008/0082661 A1 | 4/2008 | Huber | |
| 2008/0104313 A1 | 5/2008 | Chu | |
| 2009/0046717 A1* | 2/2009 | Li | H04L 69/163 370/392 |
| 2009/0110003 A1 | 4/2009 | Julien et al. | |
| 2010/0103830 A1 | 4/2010 | Salgado et al. | |
| 2010/0281257 A1 | 11/2010 | Yamazaki et al. | |
| 2011/0072234 A1 | 3/2011 | Chinya et al. | |
| 2011/0149891 A1 | 6/2011 | Ramakrishna | |
| 2011/0231564 A1 | 9/2011 | Korsunky et al. | |
| 2012/0117376 A1 | 5/2012 | Fink et al. | |
| 2012/0243539 A1 | 9/2012 | Keesara | |
| 2012/0289250 A1 | 11/2012 | Fix et al. | |
| 2012/0300648 A1 | 11/2012 | Yang | |
| 2012/0307678 A1 | 12/2012 | Gerber et al. | |
| 2013/0028121 A1 | 1/2013 | Rajapakse | |
| 2013/0058231 A1 | 3/2013 | Paddon et al. | |
| 2013/0091102 A1 | 4/2013 | Nayak | |
| 2013/0185445 A1* | 7/2013 | Larkin | H04L 65/1016 709/228 |
| 2013/0343377 A1 | 12/2013 | Stroud et al. | |
| 2014/0025806 A1 | 1/2014 | Robitaille et al. | |
| 2014/0100014 A1 | 4/2014 | Bennett, III et al. | |
| 2014/0169692 A1* | 6/2014 | Lin | H04L 69/16 382/239 |
| 2014/0173085 A1 | 6/2014 | Gupta | |
| 2014/0254598 A1 | 9/2014 | Jha et al. | |
| 2014/0280669 A1 | 9/2014 | Harper, III et al. | |
| 2014/0294019 A1 | 10/2014 | Quan et al. | |
| 2015/0100613 A1 | 4/2015 | Osiecki et al. | |
| 2015/0229714 A1* | 8/2015 | Venkatsubra | H04L 47/32 709/232 |
| 2015/0264083 A1 | 9/2015 | Prenger et al. | |
| 2016/0219024 A1* | 7/2016 | Verzun | H04L 63/102 |
| 2016/0269294 A1* | 9/2016 | Rankin | H04L 47/193 |
| 2016/0366160 A1 | 12/2016 | Kapoor et al. | |
| 2017/0012951 A1 | 1/2017 | Mennes | |
| 2017/0041296 A1 | 2/2017 | Ford et al. | |
| 2017/0090872 A1 | 3/2017 | Mathew et al. | |
| 2017/0351575 A1 | 12/2017 | Baker et al. | |
| 2018/0018147 A1 | 1/2018 | Sugawara | |
| 2018/0102975 A1 | 4/2018 | Rankin | |
| 2021/0344687 A1 | 11/2021 | Rankin | |

OTHER PUBLICATIONS

Mistree, B., PingFS, https://bmistree.com/pingfs/, pp. 1-27, Dec. 5, 2019.

Brown, J. et al., ARP Coaching Poisoning and Routing Loops in ad Hoc Networks, Mobile Networks and Applications, pp. 1306-1317, 2018.

Hansen, R. et al., Covert6: A Tool to Corroborate the Existence of IPv6 Covert Channels, Annual ADFSL Conference on Digital Forensics, Security Law, 2016.

Mileva, A. et al., Covert Channels in TCP/IP Protocol Stack—extended version—, Central European Journal of Computer Science, 2000.

York, D., Flooding Attack, Science Direct, 2021.

Rabah, K., Steganography—The Art of Hiding Data, Information Technology Journal, 2004, pp. 245-269.

Arkin, O., ICMP Usage in Scanning, The Complete Know-How, Jun. 2001.

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPV6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Mileva, Aleksandra, Covert Channels in TCP/IP Protocol Stack—extended version—, Central European Journal of Computer Science, Accepted May 9, 2014, 22 pages.

\* cited by examiner

SYSTEM AND METHOD FOR RECEIVING AND PROCESSING A SIGNAL WITHIN A TCP/IP PROTOCOL STACK

CROSS-REFERENCE TO RELATED APPLICATIONS

This application claims the benefit of U.S. Provisional Application Ser. No. 62/614,549 filed Jan. 8, 2018, the disclosures of which are hereby incorporated by reference as if fully restated herein.

TECHNICAL FIELD

Exemplary embodiments relate generally to a system and method for receiving and processing packets of data over a TCP/IP network.

BACKGROUND AND BRIEF SUMMARY OF THE INVENTION

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate by using the TCP/IP standard, or format, to transfer or share data. TCP/IP rules are established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use and manage the Internet with the goal of improving its operations and efficiencies. These documents include protocol standards, best current practices and information updates of various kinds, and are commonly referred to as Request for Comments (RFC).

TCP can be used to establish a bi-directional connection between two clients wherein activity begins with a request for information made by one client to another client. A "client" is any program or application that initiates requests for, or sends information from, one remote location to another. As used herein, the term "client" may refer to such applications including, but not limited to, web browsers, web servers, file transfer protocol (FTP) programs, electronic mail programs, line printer (LPR) programs also known as print emulators, mobile phone apps, telnet programs also known as terminal emulators, and the like, all of which may operate conceptually in an application layer.

TCP software accepts requests and data streams directly from clients and other daemons, sequentially numbering the bytes, or octets, in the stream during the time the connection is active. When required, the TCP software breaks the data stream into smaller pieces called segments (sometimes referred to as datagrams or packets generally) for transmission to a requesting client. The protocol calls for the use of checksums, sequence numbers, timestamps, time-out counters and retransmission algorithms to ensure reliable data transmission. [RFC 793, 1981]

The IP layer actually performs the communication function between two networked hosts. The IP software receives data segments from the TCP layer, ensures that the segment is sized properly to meet the requirements of the transmission path and physical adapters (such as Ethernets and CTCs). IP changes the segment size if necessary by breaking it down into smaller IP datagrams, and transmits the data to the physical network interface or layer of the host. [RFC 791, 1981]

The software that manages handling the TCP/IP RFCs may be referred to as a TCP/IP protocol stack. It may be referred to as a stack because the different protocols are often layered into this type of organization. A TCP/IP stack may have the following layers: 1) Link drivers, 2) ARP, 3) IP, 4) TCP, 5) SSL/TLS, and 6) Applications. Inbound data may transfer from layer 1 to layer 6 in turn and outbound data may take the reverse direction going from layer 6 to 1.

Depending on the implementation, these different layers can operate under the same process, or can function independently. Within the IP layer, there are several separate operational functions: 1) address resolution, 2) routing, 3) fragmentation, and 4) protocol isolation. Again, inbound data may use these functions from 1 to 4 in secession and outbound data may go in reverse order from 4 to 1.

A frame of inbound data may work its way through the stack. The inbound data may be broken down until the final payload that is destined for an application is exposed. Once the application completes operating upon the information, the response may once again be passed to the stack. On the outbound operation, additional tags and headers may be constructed that will be required to deliver the information back to its origin.

The highly defined, structured, and open nature of TCP/IP protocol stacks does not lend itself to preventing actions intended to be performed covertly (hereinafter also "covert actions") from being readily observed. Once it has been established that a payload of data which the user desire to remain covert (hereinafter also a "covert payload") can arrive at a host destination, it would be advantageous to establish how such a covert payload may be processed without being readily observed.

The present invention is directed to a system and method for accepting and processing a covert payload that avoids ready detection and observation by the receiving host. The information containing the covert payload may be intercepted within a lower level of the processing stack. A process of execution may be performed which bypasses the section of stack processing that normally opens the communication to ready observation. In this way, a covert action may be inserted into the host system without ready detection.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
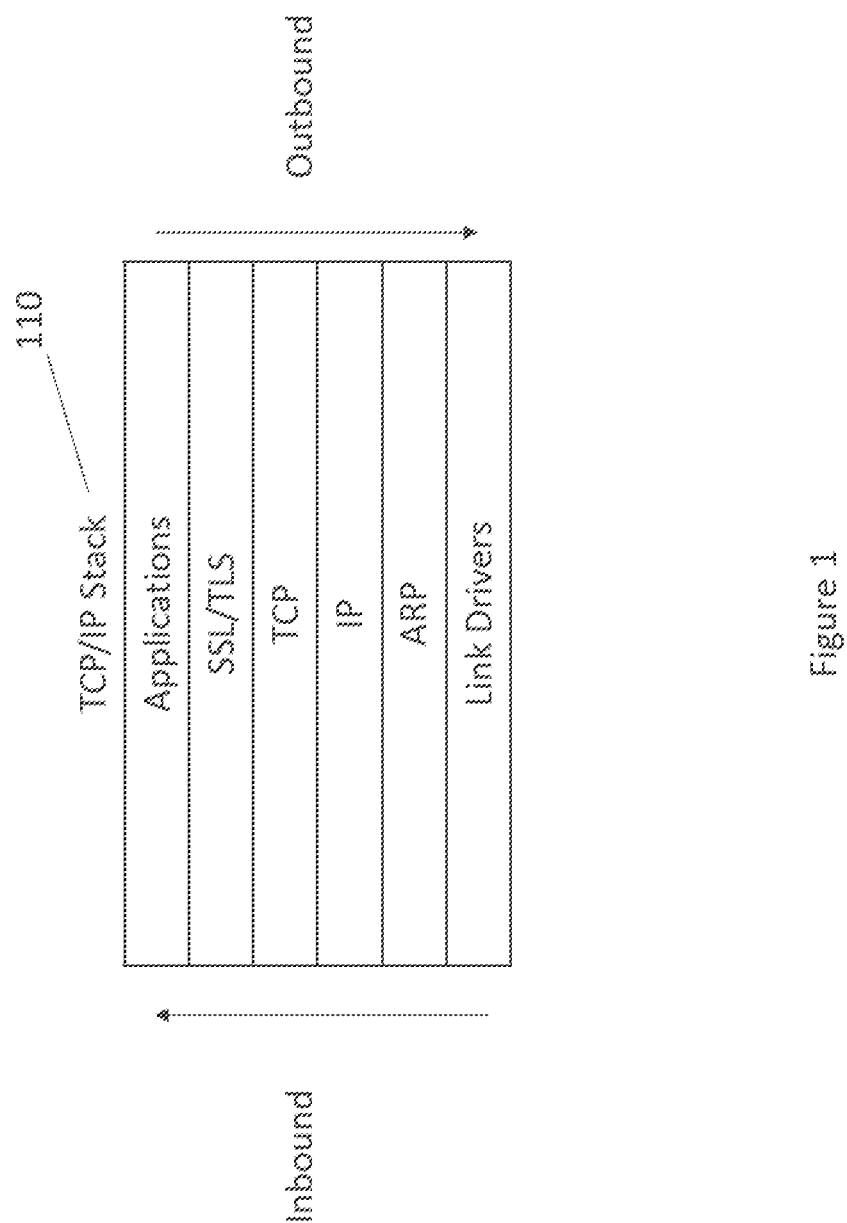
FIG. 1 is a visual representation of an exemplary TCP/IP stack.
Figure 2:
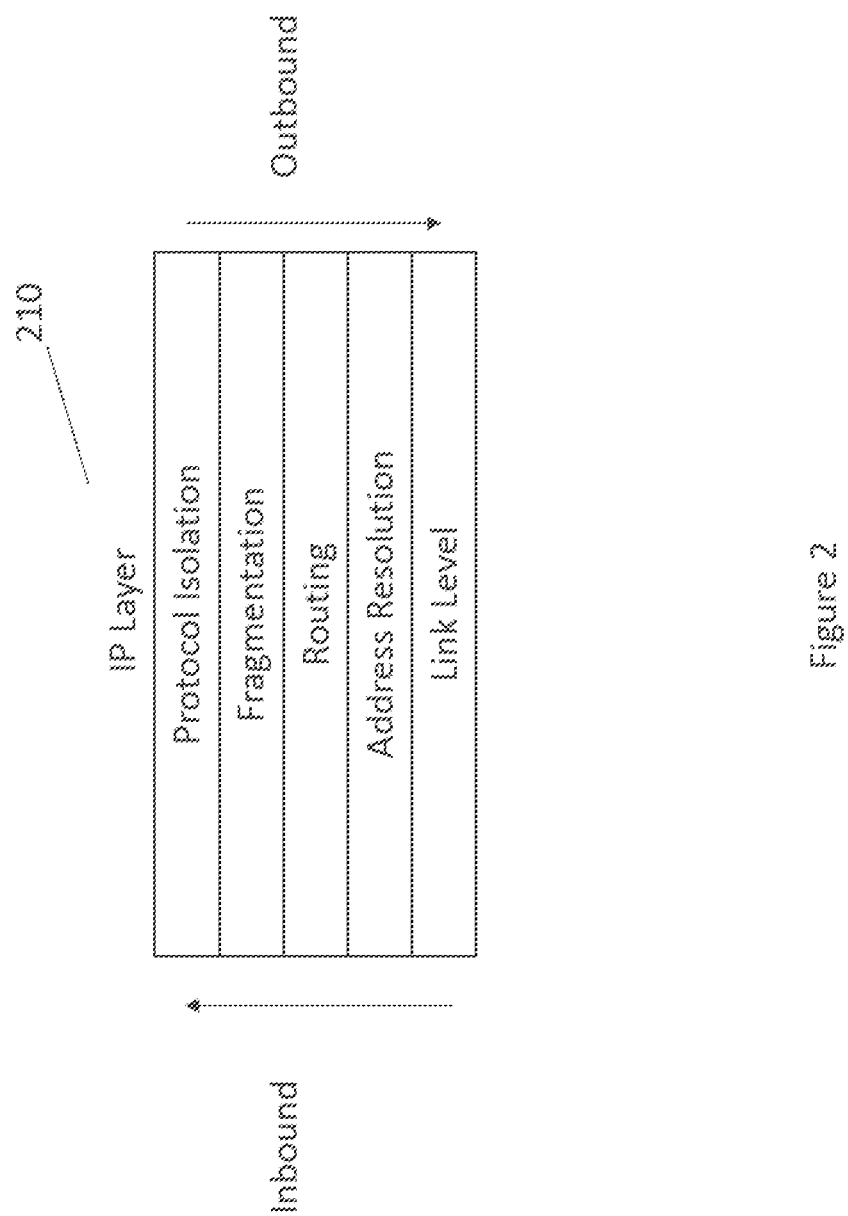
FIG. 2 is a visual representation of exemplary processes that occur at the IP layer of the TCP/IP stack of FIG. 1.

FIG. 1 and FIG. 2 are visual representations of what a typical TCP/IP stack and IP layer functions may entail.

Data Flow

An incoming payload or portion of an IP datagram that contains covert data 310 may arrive through an electrical interface and pass to the IP layer 210 for processing. This covert data 310 may enter the IP layer 210 and appear the same as other network traffic 312.

Covert insertion of information into a remote system may require the active operation of a robust implementation of a TCP/IP protocol stack 110. This implementation may be one where the source is tightly controlled, either through proprietary means, or by careful and undisclosed modifications to open source availability.

All data flow in and out of the TCP/IP stack 110 must conform correctly to all known standards of operation in order to allow such data flow to pass therethrough successfully. By providing consistent operation, the containment of covert data 310 may be masked by normal operations. Inbound and outbound data is first and foremost properly structured IP datagrams, or low-level address resolution in nature. These datagrams may contain higher level requirements and may match and conform to layers such as TCP or UPD, for example without limitation.

Any arriving covert payload 310 must be contained within the normal dataflow 312 of the TCP/IP stack 110. Covert data 310 that does not conform to recognized protocols will normally be isolated and exposed. While there are numerous methods that may be used for transmission, the covert payload 310 that appears part of normal data flow 312 will be unnoticed and unobtrusive. It is possible to contain covert information 310 directly within a standard transmission 312 destined for an application, however that application and data transmission will be recorded and observable to monitoring systems and facilities. Therefore, the transmissions of covert data 310 must be contained within standard data traffic 312, and yet be extracted and processed via unexpected portions of the IP layer 210 protocols that exist below the TCP layers protocols.

Covert Interception

Figure 3:
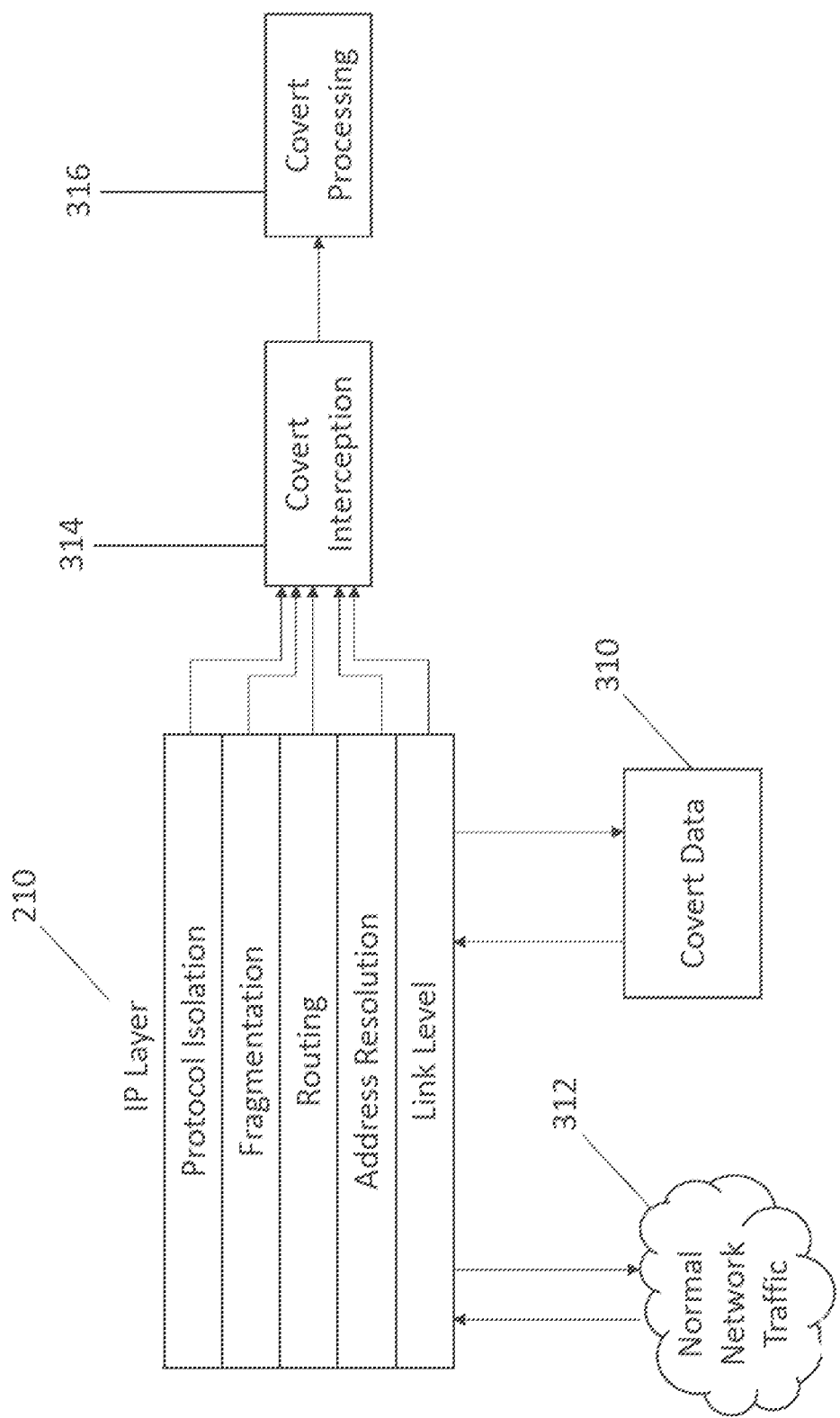
FIG. 3 is a visual representation of an exemplary data flow through the IP stack of FIG. 2.

As illustrated in FIG. 3, a packet of covert data 310 may be intercepted by a covert extraction 314 routine inserted within one of the normal IP layer 210 routines of the TCP/IP protocol stack 110. In other exemplary embodiments, the covert extraction 314 may be a routine inserted above, below, or between normal IP layer 210 routines. In still other embodiments, the covert extraction 314 routine may be an extension of one or more layers of the normal IP layer 210 routines.

Regardless, by intercepting the covert data 310 at this level of processing, the covert interception 314 mechanism can isolate, extract, and perform a covert processing 316 routine on the extracted covert data 310. The cover data 310 may be further treated as nonsense for the rest of normal operation and processing through the TCP/IP protocol stack 110. TCP/IP protocol stacks 110 are typically designed to deal with the potential of erroneous data produced by normal IP network traffic 312, and these failed pieces of information are normally be discarded without further notation or observation. Therefore, the covert interception process 314, which may be inserted between normal operations and the discard mechanism, may be used to read what otherwise appears to be nonsense, but which actually contains the covert payload 310.

Covert Processing

Once a covert payload 310 has been intercepted 314 within the IP layer 210 of a TCP/IP protocol stack 110, the covert payload 310 may be passed to a covert processing routine 316 for processing. Such covert processing 316 may comprise, for example without limitation, decoding of the covert data 310, which may be encrypted. While it is possible to spawn a process to handle this operation, the existence of an observable process may expose the existence of the covert interception 314 routine. Therefore, any processing 316 of covert data 310 may occur as an extension of the interception 314 routine, which may be an extension of, or inserted between, normal routines in the IP layer 210. In this way, existence of the covert processing 316 routine is further obfuscated. As this process may extend the IP layer 210, it is possible that a wide range of operations within the operating system may occur.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method of receiving and processing a covert transmission within a TCP/IP protocol stack, said method comprising:

receiving network traffic at an electrical interface, wherein the network traffic comprises normal network traffic and a datagram, intermingled with the normal network traffic and comprising data for covert delivery at an IP protocol layer, wherein said datagram is artificially manipulated to appear as a non-conforming data transmission at the IP layer by inaccurate description of one or more features of the datagram in a fashion which prevents normal processing through the TCP/IP protocol stack;

intercepting said datagram at a covert interception routine inserted as an extension of at least one of the IP protocol layers;

processing said datagram at a covert processing routine to extract said data for covert delivery; and subsequently discarding the datagram as a non-conforming data transmission at the IP layer.

2. The method of claim 1 wherein:
the covert processing routine is an extension of the covert interception routine.

3. The method of claim 1 wherein:
the IP protocol layer comprises:
  a link level routine,
  an address resolution routine,
  a routing routine,
  a fragmentation routine, or
  a protocol isolation routine.

4. The method of claim 3 wherein:
the covert interception routine is an extension of the link level routine.

5. The method of claim 3 wherein:
the covert interception routine is an extension of the address resolution routine.

6. The method of claim 3 wherein:
the covert interception routine is an extension of the routing routine.

7. The method of claim 3 wherein:
the covert interception routine is an extension of the fragmentation routine.

8. The method of claim 3 wherein:
the data for covert delivery is encrypted; and
the covert processing routine is configured to decrypt the data for covert delivery.

9. The method of claim 1 wherein:
the datagram is inaccurately described as a non-initial fragment of a larger transmission.

10. The method of claim 1 wherein:
the datagram is an ICMP error message.

11. A method of receiving and processing a covert transmission within a TCP/IP protocol stack, said method comprising:
  receiving, at an electrical interface, normal network traffic;
  passing the normal network traffic to an IP protocol layer;
  receiving, at the IP protocol layer, a datagram, intermingled with the normal network traffic and comprising data for covert delivery, wherein said datagram is artificially manipulated to appear as an error when processed at a IP layer by indicating the datagram to be a non-primary fragment of a larger transmission, where said larger transmission is not included within a remainder of the normal network traffic;
  prior to a timeout period, intercepting said datagram, while permitting normal processing of the remainder of said normal network traffic, at a covert interception routine extending from a routine located with the IP protocol layer and below the IP layer;
  processing said datagram, while permitting normal processing of the remainder of said normal network traffic, at a covert processing routine to extract said data for covert delivery, wherein said covert processing routine is an extension of the covert interception routine; and
  subsequently continuing normal processing of said datagram such that said datagram is discarded as appearing as an error at the IP layer at or following expiration of the timeout period.

12. A system for receiving and processing a covert transmission within a TCP/IP protocol stack, said system comprising:
  a transmitting computerized system operating the TCP/IP protocol stack and a covert data transmission routine; and
  a receiving computerized system operating the TCP/IP protocol stack, a covert interception routine inserted as an extension of at least one of the IP protocol layers of the TCP/IP protocol stack, and a covert processing routine, wherein said receiving computerized system is connected to the transmitting computerized system by way of one or more TCP/IP networks;
  wherein said transmitting computerized system is configured to generate a datagram using the covert data transmission routine by including covert data within the datagram with at least one or more inaccurately described features which prevent normal processing through the TCP/IP protocol stack at the receiving computerized system;
  wherein said receiving computerized system is configured to:
    receive network traffic by way of the one or one or more TCP/IP networks, said network traffic including said datagram;
    process said network traffic, including processing the network traffic through the TCP/IP protocol stack, intercepting said datagram at the covert interception routine and processing said datagram through the covert processing routine to extract said covert data, and subsequently resume processing of the datagram through the TCP/IP protocol stack, including discarding the datagram as a non-conforming data transmission at the IP layer due to the one or more inaccurately described features.

13. The system of claim 12 wherein:
the one or more inaccurately described features comprise indicating the datagram to be a non-initial fragment of a larger transmission.

14. The system of claim 12 wherein:
the network traffic comprises ICMP error messages; and
said datagram comprises one of the ICMP error messages.

* * * * *